United States Patent [19]

Hanson et al.

[11] 3,792,198

[45] Feb. 12, 1974

[54] PARTITION SYSTEM FOR IMAGE DISPLAYS

[75] Inventors: Charles C. Hanson; Lyle T. Lemke, both of Rochester, Minn.

[73] Assignee: International Business Machines Corporation, Armonk, N.Y.

[22] Filed: Sept. 28, 1972

[21] Appl. No.: 293,200

[52] U.S. Cl. .............. 178/7.91, 178/7.82, 178/7.88, 178/DIG. 23

[51] Int. Cl. .......................... H04n 5/72, H04n 7/08

[58] Field of Search ....... 178/7.88, 7.89, 7.82, 7.85, 178/7.91, 6.5, DIG. 23; 179/2 TV

[56] References Cited

UNITED STATES PATENTS 2,537,173 1/1951 Szegho ............................ 179/2 TV

*Primary Examiner*—Howard W. Britton
*Attorney, Agent, or Firm*—Donald F. Voss

[57] ABSTRACT

A louvered film is positioned over the screen of an image display device such as a cathode ray tube to divide the screen into discrete viewable portions discernable only from predetermined viewing angles to enable viewers at different viewing angles to see only one of the viewable portions. In one embodiment, the louvers in the film restrict the viewing angle in a direction normal to the face of the cathode ray tube. A pair of mirrors are positioned at angles with respect to each other and the louvered film whereby viewers facing each other are restricted to viewing different discrete areas on the cathode ray tube screen. By partitioning the screen into discrete viewing areas, a single display device can function as multiple display devices.

In another embodiment, instead of using mirrors, the louvers in the film are positioned at a different angle for each viewing area whereby side by side viewers see discrete viewing areas from predetermined viewing angles.

5 Claims, 10 Drawing Figures

PARTITION SYSTEM FOR IMAGE DISPLAYS

BACKGROUND OF THE INVENTION

1. Field of the Invention

This invention relates to image display systems and more particularly to an image display system where a single display device is partitioned into discrete viewing portions to effect the function of multiple displays.

The invention is particularly useful where it is desired to provide an individual display for machine operators sitting along side or across from each other as in a data entry machine room environment. The operators in effect are sharing a single display device without the loss of display quality.

2. Description of the Prior Art

In the past, it has been the practice to provide each data entry machine operator with any individual display device without regard to the relative physical positions of the operators. Data entry machine operators sit at a keyboard and by operating the same, they enter data on storage media. As they operate the keyboard, the data entered is displayed on the face of an image display device. This enables the operator to monitor the data entered.

Individual display devices are expensive irrespective of their size because of the necessary individual drive control and power circuitry. Hence, even through the electronic circuitry for furnishing the data to the display devices could be shared, in the past there has been no sharing of the apparatus for generating the display.

In the present invention, a single cathode ray tube functions as multi-display devices. The physical structure of the cathode ray tube is not changed. A single gun structure is still used and the deflection system is substantially the same. The images to be displayed in the device viewing areas are generated sequentially but at a rate which is timely for the viewer or machine operator. In the embodiment using the mirrors, it is necessary to provide controls whereby one display has its top line at the bottom of the display with the characters inverted and the first character of the line appearing at the lefthand side of the line. The other lines of the one display are appropriately spaced from each other and the bottom line is the top line of the display. The mirror associated with this one display makes the appropriate inversion of the characters and the lines so that the top line appears at the top of the display to the viewer and the lines read from left to right with the characters in the upright position.

The top line of the other display is at the top of the display and the characters are not inverted but are backwards and the first character in the line of characters is at the righthand side of the line. The associated mirror reverses the lines so that they appear to read left to right to the viewer. The louvered film limits the viewing angle so that the mirror associated with the one display does not reflect the other display and the mirror associated with the other display does not reflect the one display.

SUMMARY OF THE INVENTION

The principal object of the invention is to provide an improved image display system which: (a) is relatively inexpensive; (b) utilizes a single display device functioning as multiple display devices; and (c) provides high quality image displays.

DESCRIPTION

Figure 1:
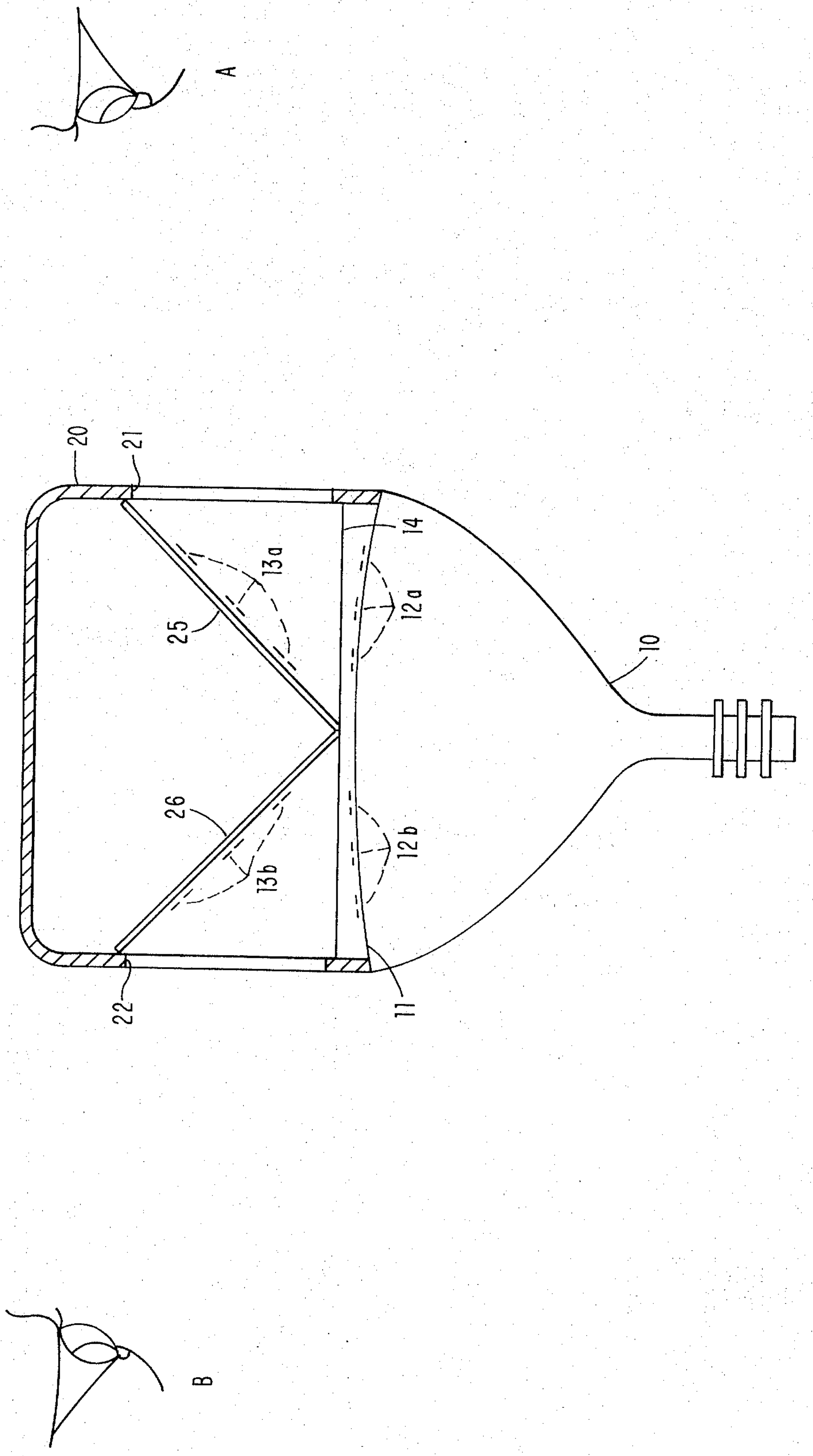
FIG. 1 is an elevational view illustrating the preferred embodiment of the invention where the cathode ray tube is mounted vertically, the louvred film lies horizontally over the face of the cathode ray tube and a pair of mirrors are at an angle with respect to each other and the louvered film.
Figure 10:
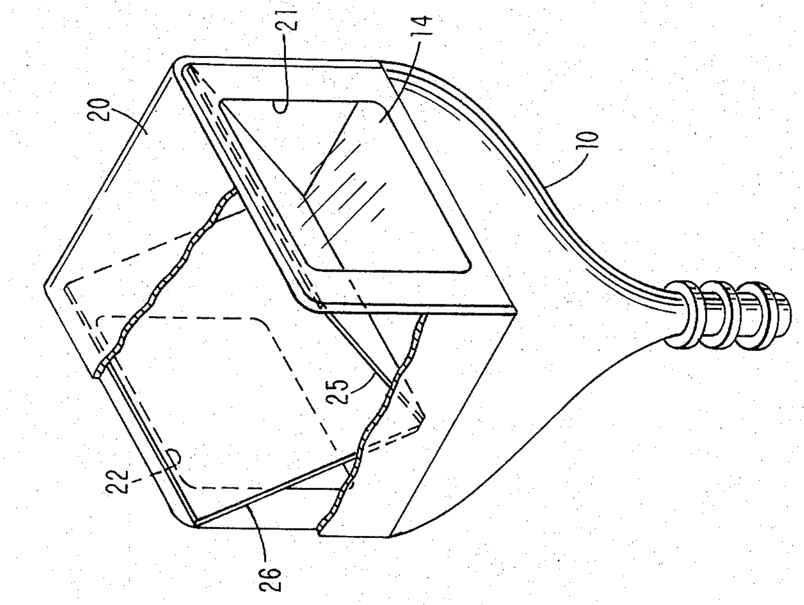

With reference to the drawings, and particularly to FIGS. 1 and 10, the invention is illustrated by way of example as including a conventional cathode ray tube (CRT) 10 mounted in a vertical position. In this particular example, the screen 11 of CRT 10 is partitioned into two discrete viewable portions discernable by viewers A and B at their respective viewing angles. Lines of information appearing on the screen 11 are represented by dotted lines 12a and 12b. A louvered film 14 is suitably supported in a housing 20 in close proximity to screen 11.

Housing 20 overlies screen 11 and is suitably supported relative to CRT 10 by supports which are not shown. Housing 20 is provided with longitudinal rectangular viewing aperatures 21 and 22 for viewers A and B respectively. Mirrors 25 and 26 are contained with housing 20 and are symmetrically arranged with respect to the vertical center line of housing 20. The mirrors 25 and 26 extend at an angle from film 14 to points just beyond the upper boundaries of aperatures 21 and 22 respectively. Mirrors 25 and 26 are suitably secured to the ends of housing 20.

Figure 3:
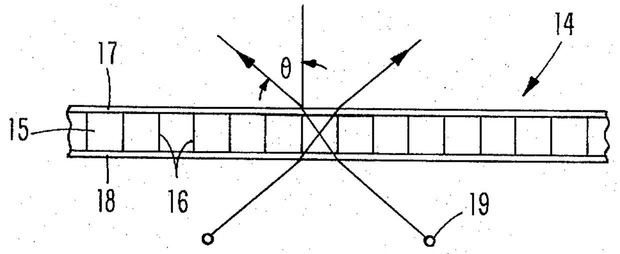
FIG. 3 is a fragmentary expanded sectional view of the louvered film of FIG. 1.

The lines of information *12a* and *12b* appearing on screen 11 appear as lines *13a* and *13b* on mirrors 25 and 26 respectively. The louvered film 14 restricts the viewing angle whereby the mirror 25 does not reflect to viewer A the images, i.e., lines *12b* for viewer B and mirror 26 does not reflect to viewer B any images, i.e., lines *12a* for viewer A. In this manner, viewers A and B are able to observe a discrete image area without image interference. The louvered film 14 is shown in enlarged form in FIG. 3. Film 14 is a thin piece of plastic including a central core 15 incorporating black or colored closely spaced miniature louvers 16. Core 15 is sandwiched between cover sheets 17 and 18. The louvers are approximately 0.0003 inches wide with a clear film width of 0.010 inches between louvers. Cover sheets 17 and 18 are approximately 0.005 inches thick and the overall film is between 0.015 and 0.030 inches thick. The louvered film 14 is commercially available from the 3M Company and is known as light control film. The louvers 16 are oriented perpendicularly and the maximum viewing angle is equal to the angle $\theta$ shown in FIG. 3 as light enters film 14 from the point source 19 and emerges from the film.

Figure 2:
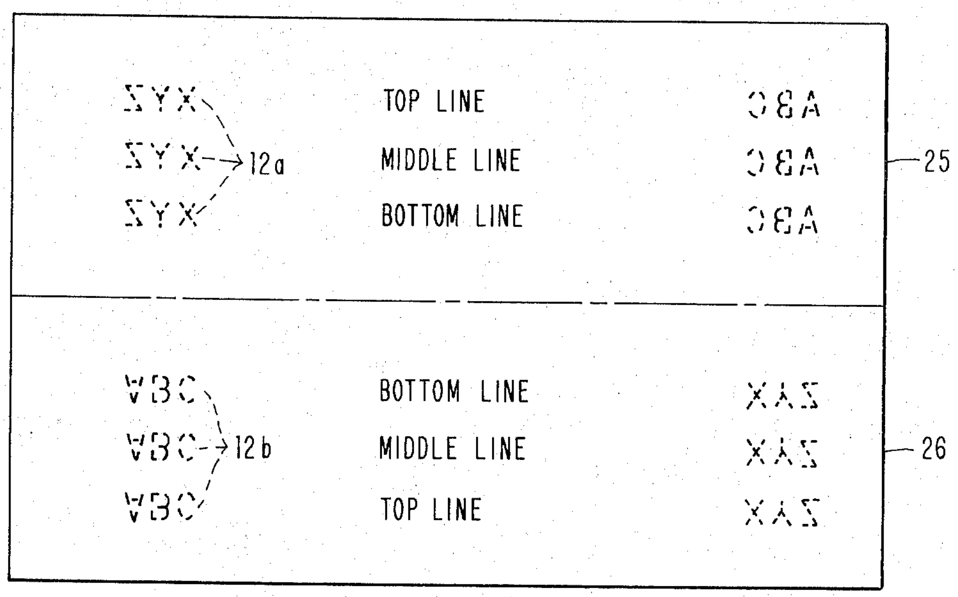
FIG. 2 is a top view of the preferred embodiment shown in FIG. 1 without the housing.

In FIG. 2, mirrors 25 and 26 are shown as overlying lines of information 12a and 12b on screen 11. The characters forming the lines of information 12*a* are backwards and the first character in each line is at the righthand side of the line. The lines are oriented with the top line at the top and the bottom line at the bottom. Mirror 25 reverses the characters and lines so that the characters appear normal and the lines read left to right to viewer A. The characters forming lines 12*b* are inverted and the first character of each line appears at the lefthand side of the line. The bottom line is at the top of the display and the top line is at the bottom of the display. Mirror 26 inverts the characters and lines so that the top line appears at the top of the display to viewer B and the lines read from left to right with the characters in the upright position. The line inversion for lines 12b can be seen in FIG. 1.

Figure 4:
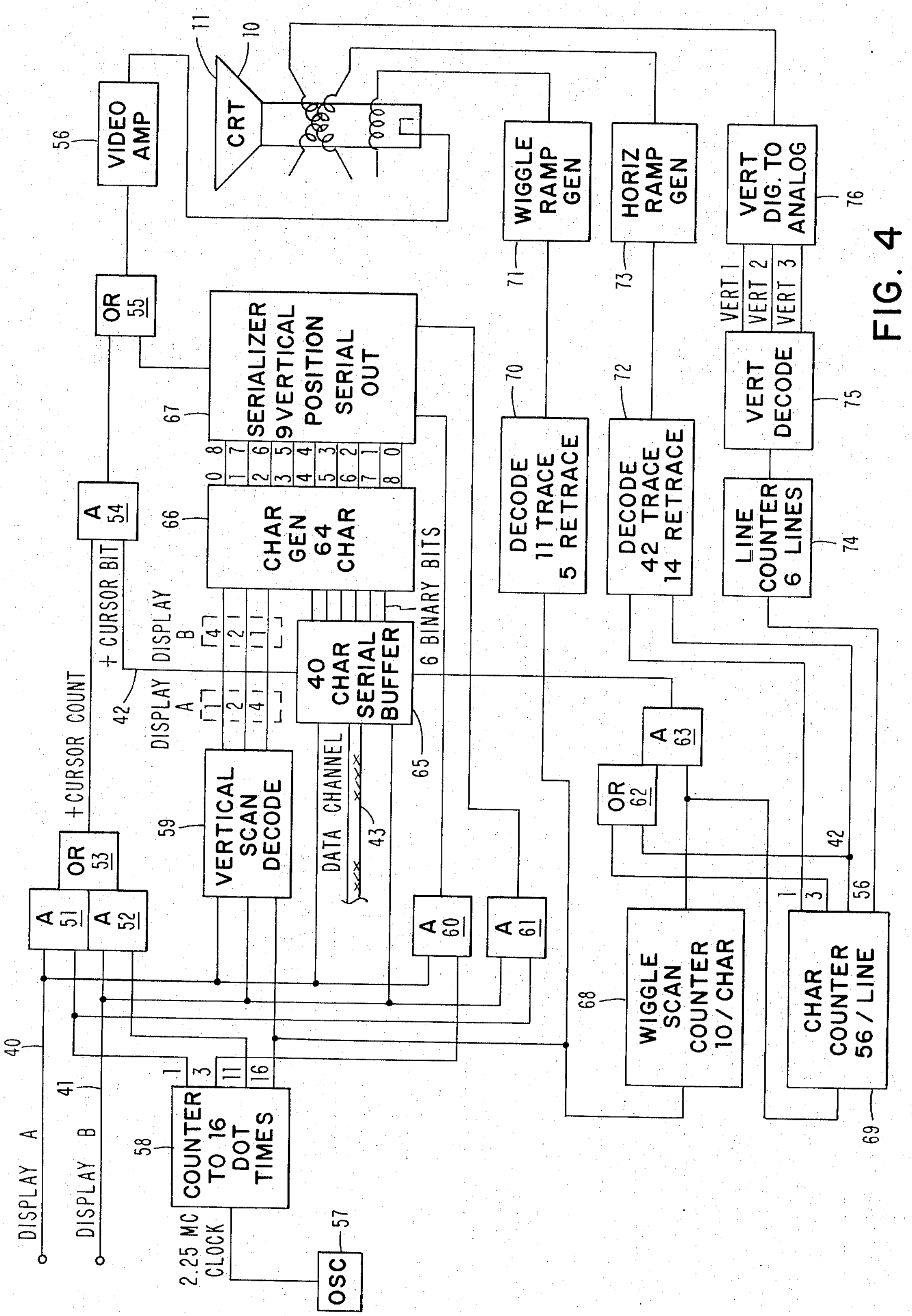
FIG. 4 is a block diagram of the deflection logic and deflection system for the cathode ray tube.

The beam of cathode ray tube 10 is generated and deflected by the circuitry shown in FIG. 4. The beam is generated by an output signal from video amplifier 56. The characters are formed utilizing a wiggle sweep from wiggle ramp generator 71. The beam is swept horizontally by a signal from horizontal ramp generator 73 and is positioned to the desired line position by signals from vertical digital to analog converter 76.

Figure 5:
FIG. 5 is a schematic view illustrating the scanning sequence for a character with a coursor underneath.
Figure 5:
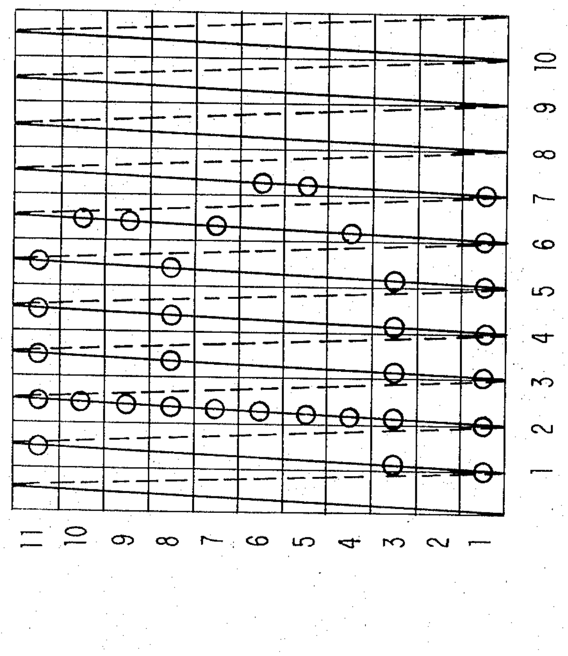

As the beam sweeps horizontally across the screen 11 in this particular example, a line of forty characters can be formed. Each character position can be considered as a 10 × 11 matrix. The beam during its horizontal movement across screen 11 is vertically deflected up and down by wiggle ramp generator 71 at the rate of 10 up and down excursions per character position. The up excursion is divided into eleven bit times. This provides the 10 × 11 matrix. The down excursion is for beam retrace and consists of five bit times. During the up excursion, as seen in FIG. 5, the first up bit time is reserved for displaying a cursor bit. The next bit time is blank to provide a space between the cursor and the bottom of the character. Thus, nine vertical bit times are used for forming the character. Further, only seven of the 10 up excusions are used for forming a character. The remaining three up excusions provide for a blank space between characters. By this arrangement, the characters are formed by turning the video amplifier 56 on during a bit time where a dot is to appear. The character in FIG. 5 is a B underscored by a cursor.

In FIG. 4 control line 40 is energized from a controller not shown during the time that lines 12*a* will be displayed to viewer A. Similarly, control line 41 is energized during the time that lines 12*b* are being displayed to viewer B. Control line 40 provides a conditioning signal for AND circuit 51 for passing a cursor count from counter 58 which is advanced by pulses from oscillator 57. During the up excusion of the beam, the first bit is a cursor bit for normally oriented characters, i.e., characters forming lines 12*a*. However, for inverted characters, the cursor bit is at bit eleven. Therefore, the output from the first position of counter 58 is applied to AND circuit 51 and the output from position eleven is applied to AND circuit 52 which is conditioned by the signal on conductor 41. Counter 58 is a conventional counter such as a ring counter which counts to 16 and then resets.

The outputs of AND circuits 51 and 52 are passed via OR circuit 53 to AND circuit 54. The cursor bit itself is contained in character buffer 65 and the bit position for the cursor in this buffer is connected by conductor 42 to AND circuit 54. The output of AND circuit 54 is connected to video amplifier 56 via OR circuit 55. Thus, the cursor bit will appear upon the screen 11 of CRT 10 at either bit one or bit 11 during the up excursion of the beam if there is a cursor bit in character buffer 65. Buffer 65 is loaded with data from a data source, not shown, via data channel 43. Each character is represented in coded form in buffer 65 by six binary bits. Seven bits are required for the cursor. The characters in buffer 65 are transferred one at a time to the character generator 66. In order to transfer a character from buffer 65 to character generator 66 in the proper orientation, control lines 40 and 41 are also applied to buffer 65.

As pointed out previously, the character is formed on screen 11 during seven up excursions. Vertical scan decode block 59 has an input from position 16 of counter 58 and inputs from conductors 40 and 41 to properly provide indications of the seven up excursions. Vertical scan decode block 59 has three binary output having binary bit values 1, 2 and 4 and binary bit values 4, 2 and 1 when conductors 40 and 41 are energized respectively. The three output conductors from vertical scan decode block 59 are applied to character generator 66.

Character generator 66 provides nine bits in parallel to serializer circuit 67. It will be recalled that during the up excursion of the beam, only nine of the 11 bits are used for generating the character. The serialized bits are passed by serializer 67 to video amplifier 56 via OR circuit 55. It should be noted that the nine bits passed in parallel by character generator 66 will have an inverse orientation when conductor 41 is energized. It should be further noted that the serializer 67 does not pass any bits to video amplifier 56 until bit three when displaying images to viewer A, i.e., when conductor 40 is energized but passes bits as bit one when images are being displayed for viewer B, i.e., when conductor 41 is energized. This control is accomplished by AND circuits 60 and 61.

The wiggle ramp generator 71 is controlled by signals from decode circuit 70 which has an input from position 16 of counter 58. Decode circuit 70 provides a signal to wiggle ramp generator 71 for the up excursion for 11 bits and a signal for the down excursion for five bits. The control for the 10 up and down excursions for each character is provided by wiggle scan counter 68. Counter 68 has an input connected to position 16 of counter 58. The output of counter 68 is applied to AND circuit 63 and to character counter 69. Counter 68 has an output for every 10 input signals from counter 58. The output signal from counter 68 is used for transferring six binary bits at a time from character buffer 65 and for advancing character counter 69. However, the first two character positions in a line are blank so as to provide sufficient time for the circuitry to settle down after character buffer 65 has been loaded. Thus, OR circuit 62 which conditions AND circuit 63 provides a conditioning signal from character position three time to character position 42 time, i.e., for 40 character positions. In this manner, a line of characters are generated. The beam must then retrace to the beginning of the next line. Retrace takes place during 14 character position times.

Counter 69 provides inputs to decode circuitry 72 for generating signals to energize horizontal ramp generator 73 whereby the beam is driven horizontally for 42 character positions and then retraces in a reverse direction. During retract, the beam moves at a faster speed and retraces in a time allotted for 14 character positions. Position 56 of counter 69 advances line counter 74. The output of line counter 74 is decoded by vertical decode circuit 75 which provides three binary outputs to vertical digital to analog converter 76. The output of vertical to analog converter 76 positions the beam vertically to each line position as determined by the outputs from vertical decode circuit 75.

Figure 7:
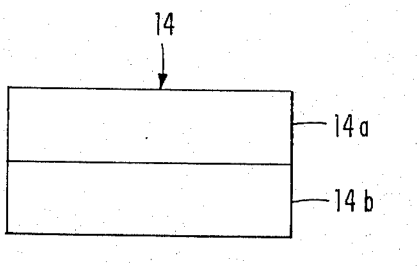
FIG. 7 is an elevational view of the louvered film of FIG. 6.
Figure 8:
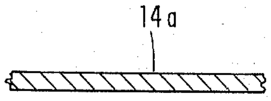
FIG. 8 is a fragmentary expanded sectional view of the top half of the louvered film in FIG. 7.
Figure 9:
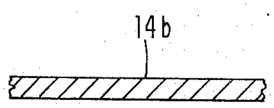
FIG. 9 is a fragmentary expanded sectional view of the bottom half of the louvered film in FIG. 7; and, FIG. 10 is an isometric view of the preferred embodiment of FIG. 1.
Figure 6:
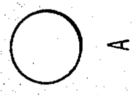
FIG. 6 is a top view illustrating an alternate embodiment of the invention where the cathode ray tube is mounted horizontally and the louvered film is positioned vertically in front of the face of the cathode ray tube.
Figure 6:
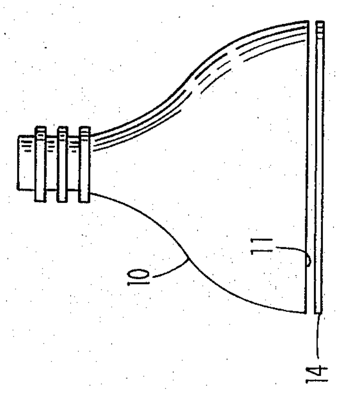

An alternate embodiment of the invention as shown in FIG. 6. In this embodiment CRT 10 is positioned in the horizontal plane and viewers A and B are located adjacent to each other or in a side position. The louvered film 14 is suitably supported directly in front of the screen 11. The louvered film 14 is divided into an upper section 14*a* and a lower section 14*b* as shown in FIG. 7. The louvers in the film portion 14*a* are at an angle as shown in FIG. 8 to restrict observation of images displayed on the top half of screen 11 to viewer A. Similarly, the louvers in the portion 14*b* are at an angle to restrict the observation of images on the lower half of screen 11 to viewer B. The images displayed on screen 11 are in the upright position and read from left to right. The circuitry of FIG. 4 can be easily modified to generate characters for the alternate embodiment. position 1 of counter 16 would be directly applied to AND circuit 54. AND circuits 51 and 52 and OR circuit 53 would be eliminated. The vertical scan decode circuit 59 would not require the control line inputs 40 and 41. Similarly, AND circuits 60 and 61 would not be necessary. Serializer 67 would be controlled by position three of counter 58. The remaining portion of the circuitry would remain substantially the same.

From the foregoing, it is seen that the invention provides an image display system incorporating a single display device partitioned into discrete viewing portions to effect the function of multiple displays. In the preferred embodiment of the invention the viewers do not look directly at the face of the image display device. This has advantages because glare is substantially eliminated and image contrast is enhanced. The optical components, i.e., the mirrors and louvered film, are relatively inexpensive as compared to lenses and fiberoptic devices. Further, a single deflection system is used for controlling the generation of the images for the multiple display.

What is claimed is:

1. An image display system comprising an image display device having a viewable screen and selectively controllable whereby at least two sets of information are presented to at least two different areas on said screen, means for controlling said image display device to present one set of information to one area backwards and another set of information to another area upside down on said screen, a louvered film positioned over said screen of said display device and having louvers for restricting the viewing angle in a direction normal to said screen, and at least one pair of mirrors positioned at an angle with respect to each other and said louvered film so that one mirror reflects said one set of information presented at said one of said areas forwards for observation from one direction without reflecting said another set of information at said another area and the other mirror reflects said another set of information at said another area right side up for observation from an opposite direction without reflecting said one set of information at said one area.

2. The image display system of claim 1 wherein said sets of information are lines of characters and the top and bottom lines displayed at said one area are at the top and bottom of said one area and the top and bottom lines displayed at said another area are at the bottom and top of said another area.

3. The image display system of claim 1 wherein said means for controlling said image display device presents discrete images sequentially to form said sets of information at said one and another areas of said screen.

4. An image display system comprising an image display device having a viewable screen and selectively controllable whereby discrete images are presented at different areas of said screens, means for controlling said image display device to present discrete images at different areas of said screen, and a louvered film positioned over said screen and having louvers corresponding to one of said different areas at one angle to limit the viewing of said one different area to one viewing angle and louvers corresponding to another of said different areas at another angle to limit the viewing of said another different area to another viewing angle.

5. An image display system comprising a cathode ray tube having a screen and a beam generating element, horizontal, vertical and wiggle deflection elements for deflecting the beam of said cathode ray tube, a louvered film positioned over said screen and having louvers for restricting the viewing angle in a direction normal to said screen, a pair of mirrors positioned back to back at an angle to form a vertex terminating in close proximity to said louvered film, vertical deflection generator means connected to said vertical deflection element for vertically positioning the beam generated by said beam generating element to predetermined line positions on said screen, horizontal ramp generator means connected to said horizontal deflection elements for deflecting said beam in a horizontal trace and retrace as said vertical deflection generator means position said beam vertically, wiggle ramp generator means connected to said wiggle deflection element for moving said beam up and down as said beam is in a horizontal trace, video generating means connected to said beam generating element and selectively operable to turn said beam on and off, said video generating means, including character generator means and cursor generating means for providing a plurality of turn on and turn off control signals, and control means for controlling said vertical, horizontal and wiggle generating means and said video generating means whereby characters in at least one horizontal line of characters reflected by one of said mirrors are backwards with a cursor formed underneath each character as each character is formed and characters in at least one other line of characters reflected by the other of said mirrors are upsidedown with a cursor formed at the top of each upsidedown character.

* * * * *